May 7, 1968 J. W. SCHWARTZ 3,382,393

COLOR TELEVISION TUBE WITH FACEPLATE PANEL OF HIGH TRANSMITTANCE IN THE RED COLOR

Filed Sept. 8, 1966

INVENTOR.
James W. Schwartz
BY
Dawson, Tilton, Fallon, Lungmus, and Alexander.
ATTORNEYS United States Patent Office
3,382,393
Patented May 7, 1968

3,382,393

COLOR TELEVISION TUBE WITH FACEPLATE PANEL OF HIGH TRANSMITTANCE IN THE RED COLOR

James W. Schwartz, Western Springs, Ill., assignor to National Video Corporation, Chicago, Ill., a corporation of Illinois Filed Sept. 8, 1966, Ser. No. 578,092
3 Claims. (Cl. 313—92)

ABSTRACT OF THE DISCLOSURE

In a conventional color television tube of the shadow mask type, in which the phosphor deposited on the interior of the faceplate panel for emitting red light is yttrium vanadate activated by europium, an additive of substantial portion of phosphorous pentoxide augmented by minor amounts of ferric and nickel oxide is included with the faceplate panel for promoting the transmittance of the red color. In a further improvement in which a glass safety panel if affixed to the exterior of the faceplate panel with an adhesive, dichroic crystals are added to the adhesive for attenuating the transmittance of the light generated by phosphors other than the red phosphor to substantially enhance color contrast.

This invention relates to a novel color television tube and, more particularly, to a tube arrangement characterized by unique transmissibility of certain color information.

The color information transmitted through the face plate of a color tube is developed by the impingement of the electron beam on the cathode-luminescent phosphors, conventionally arranged in triads of red, blue and green dots as a screen on the inner surface of the tube face plate. Thus, the visible color information must pass through the glass face plate. Additionally, the color information must pass through the glass of the safety panel. The safety panel conventionally is constructed of material having some absorption characteristics to reduce glare by reducing the amount of reflected light. For example, if 50% of the light passing through the gray glass of the safety panel is absorbed, 50% of the emitted color information is available while only 25% of the incident light in the room returns via reflection from the screen. In many instances, however, this provides an inadequate contrast either because the incident light is too strong or the emitted light from the phosphors is too weak, or both.

The object of this invention is to solve the problem of providing maximum contrast between reflected and emitted or luminescent light. Another object is to provide a color television tube arrangement wherein the viewing portion is arranged for maximum transmittance of certain colors and maximum absorption of the remainder of the visible spectrum. Other objects and advantages may be seen in the details of this specification.

The invention is explained in conjunction with an illustrative embodiment in the accompanying drawing, in which—

Figure 1:
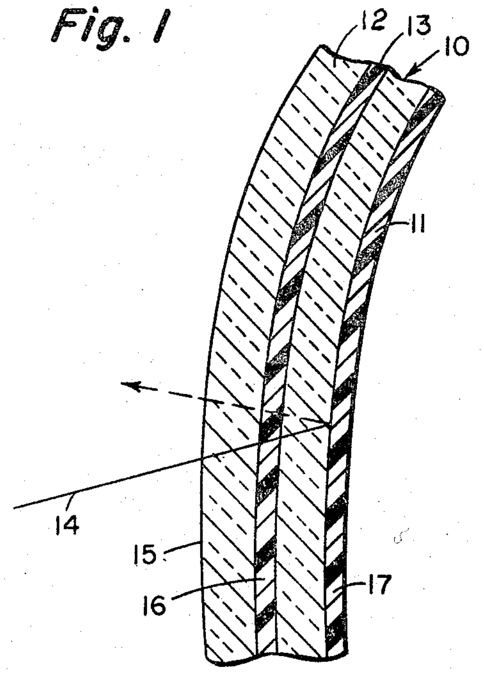
Figure 2:
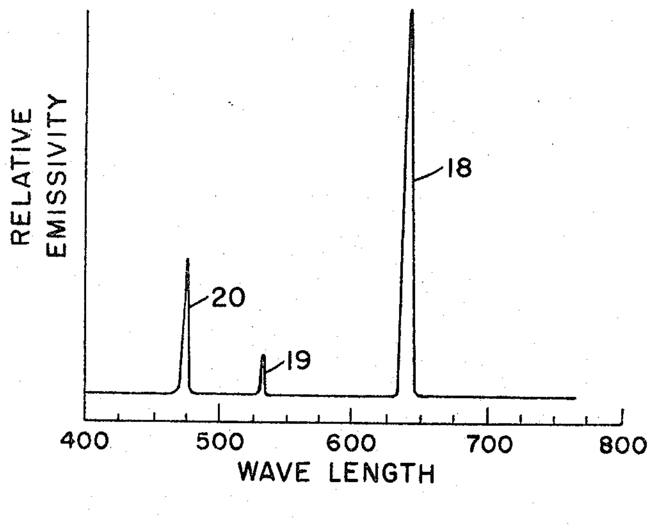

FIG. 1 is a fragmentary sectional view taken through the viewing end of a color television tube; and FIG. 2 is a graph showing relative emissivity of certain colors as a function of wavelength.

In the illustration given and with reference to FIG. 1, the numeral 10 designates generally the glass face-plate portion of the envelope of a color television tube. Inwardly of the tube, the face-plate is equipped with a screen 11 which embodies the previously-mentioned phosphor dots. Outwardly of the tube envelope, there is provided a safety panel 12 which is advantageously affixed to the face-plate 10 by means of an adhesive layer 13. An incident light ray as at 14 from a lamp, overhead light, etc., may be reflected from any one of the surfaces 15, 16 or 17, the bulk of the reflection, however, being attributable to the surface 17 provided by the screen 11. Also, as pointed out previously, the safety panel 12 may be constructed of plate glass or other absorptive-type glass so that the reflected rays are substantially attenuated.

In one embodiment of the invention, I achieve substantial contrast between reflected and emitted light by constituting at least one—and preferably all three—of the phosphor dots of each triad of essentially monochromatic material, i.e., a phosphor that emits or scintillates in virtually a single wavelength, i.e., a very narrow band of wavelengths as at 18, 19 and 20 in FIG. 2 relative to red, green and blue, respectively. In combination with this, I equip the viewing portion of the tube with means to impart a greater transmittance for the spectral peaks than visible light of wavelengths other than the aforesaid peaks. The eye is normally sensitive to light radiations of wavelengths of the order of 400–800 millimicrons and this portion of the spectrum is presented in FIG. 2. The phosphor-emitting wavelengths for red, green and blue, are of the order of 620, 540 and 480 millimicrons, being achieved by fortifying the yttrium vanadate material ($YVO_4$) with europium, holmium and thulium, respectively—of the order of about 5%. It will be appreciated that the emissivity of the three colors is not equal but the reduced level emissivity for blue and green can be tolerated since equal beam currents develop substantially greater emission for these colors than red. With the same efficiency of conversion of electrical power to light, the relationship of currents in the three guns (not shown) to yield equal luminance is 40:9:4 for red, green and blue, respectively. Therefore, I incorporate means to enhance the transmittance of the red wavelength and for this purpose (in one of the elements 10, 12 and 13), a substantial portion of phosphorous pentoxide augmented by minor amounts of ferric and nickel oxides. When used as a film, a transparent polymeric binder is fortified by about 75% $P_2O_5$, 3% $Fe_2O_3$ and 4% $Ni_2O_3$. This can be advantageously incorporated in the glass, either of the face-plate 10 or of the safety panel 12. For suppressing transmittance of wavelengths other than those of the spectral peaks 19 and 20, I can employ dichroic crystals forming the film 13.

While in the foregoing specification a detailed description of an embodiment of the invention has been set down for the purpose of explanation, many variations in the details herein given may be made by those skilled in the art without departing from the spirit and scope of the invention.

I claim:

1. In a color television tube including a glass faceplate panel defining a viewing screen, cathodo-luminescent phosphors deposited in a pattern on the interior of said faceplate panel on said screen and adapted to emit light of different colors, one of said phosphors being yttrium vanadate activated by europium, the improvement comprising an additive to said glass faceplate panel including a substantial portion of phosphorous pentoxide augmented by minor amounts of ferric oxide and nickel oxide for promoting the transmittance of the said one phosphor.

2. In the structure of claim 1 wherein said tube includes a glass safety panel affixed to the exterior of said faceplate panel with an adhesive, the further improvement comprising said adhesive including dichroic crystals for attenuating the transmittance of light generated by phosphors other than the said one whereby the color contrast of said tube is substantially improved.

3. The structure of claim 1 wherein said adhesive is in the form of a transparent polymeric binder fortified by about 75% phosphorous pentoxide, 3% ferric oxide and 4% nickel oxide.

References Cited

UNITED STATES PATENTS

| | | | |
|---|---|---|---|
| 3,114,065 | 12/1963 | Kaplan | 313—112 X |
| 3,143,683 | 8/1964 | Duncan et al. | 313—110 |
| 3,243,625 | 3/1966 | Levine et al. | 313—92 |

JAMES W. LAWRENCE, *Primary Examiner.*

V. LAFRANCHI, *Assistant Examiner.*